United States Patent [19]

Strickland et al.

[11] Patent Number: 5,455,549
[45] Date of Patent: Oct. 3, 1995

[54] MULTI-FUNCTION BUTTON FOR ELECTRONIC OVERLOAD RELAY

[75] Inventors: Woothi Strickland, Decatur; Bruno C. Doerwald, Duluth, both of Ga.

[73] Assignee: Siemens Energy & Automation, Inc., Alpharetta, Ga.

[21] Appl. No.: 201,974

[22] Filed: Feb. 25, 1994

[51] Int. Cl.⁶ .................................................. H01H 73/12
[52] U.S. Cl. ............................................. 335/17; 116/281
[58] Field of Search ............................ 335/17, 132, 202, 335/18; 361/42–50; 116/281–283

[56] References Cited

U.S. PATENT DOCUMENTS

| | | | |
|---|---|---|---|
| 3,495,203 | 2/1970 | Neubauer | 337/335 |
| 3,715,699 | 2/1973 | Hire | 337/376 |
| 4,347,541 | 8/1982 | Chen et al. | |
| 4,722,059 | 1/1988 | Eagel et al. | |
| 4,949,214 | 8/1990 | Spencer | |

Primary Examiner—Lincoln Donovan

[57] ABSTRACT

An overload relay with a multi-function control button is disclosed herein. The overload relay includes a contactor having a solenoid which holds the contacts of the contactor closed when energized. Power to the solenoid is provided by the power conductors connected to the contacts of the contactor. The power provided to the solenoid is controlled by a switch which is operated with the multi-function button. The multi-function button includes a slidable member and an indicator member movably contained within the slidable member. The indicator member is mechanically connected with the contacts of the switch which control the application of power to the solenoid. When these contacts are disengaged, the indicator member has a portion which extends beyond the tubular member to produce a visual indication that the supply of power to the contactor solenoid has terminated and the contacts of the contactor are open.

38 Claims, 6 Drawing Sheets

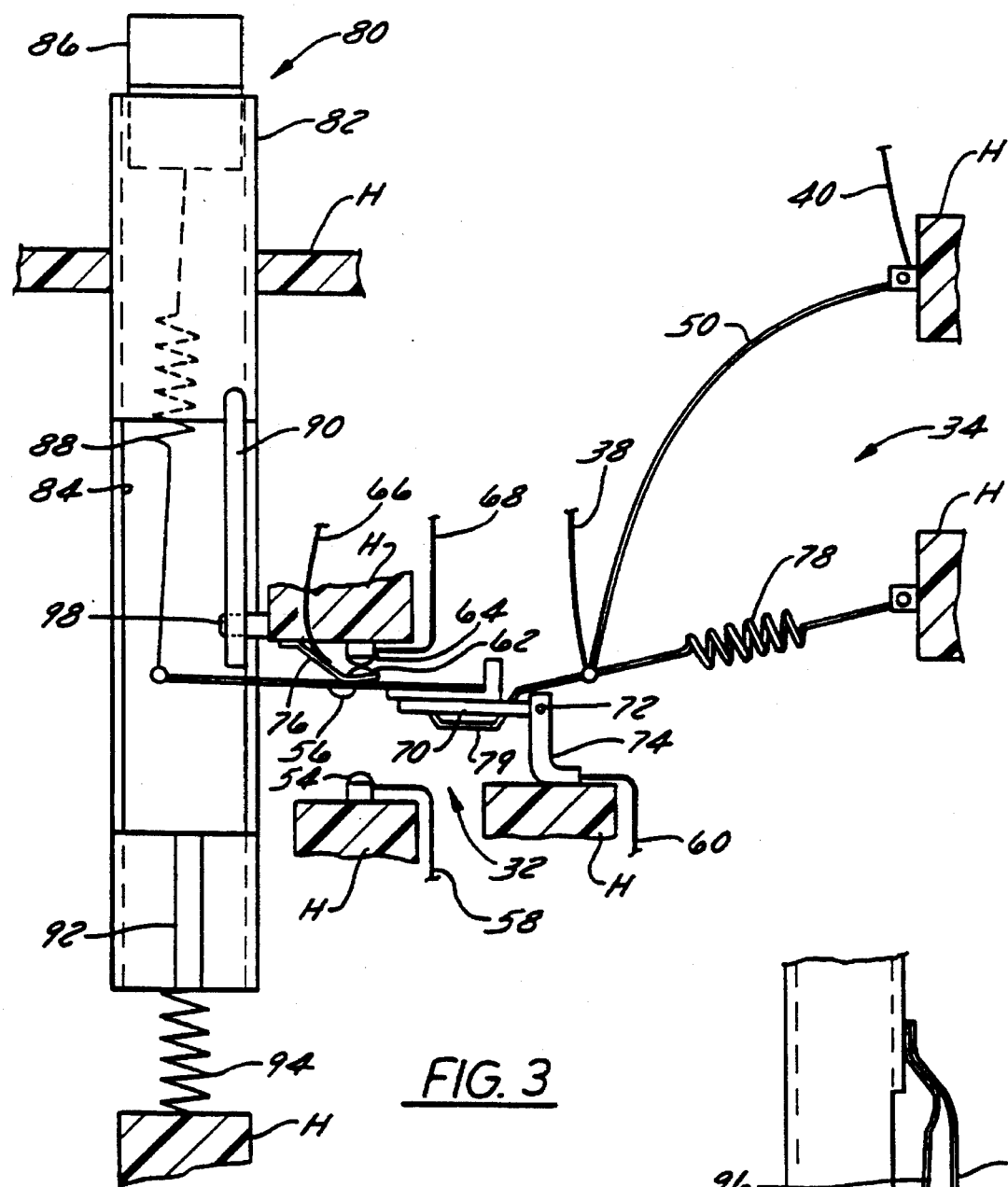
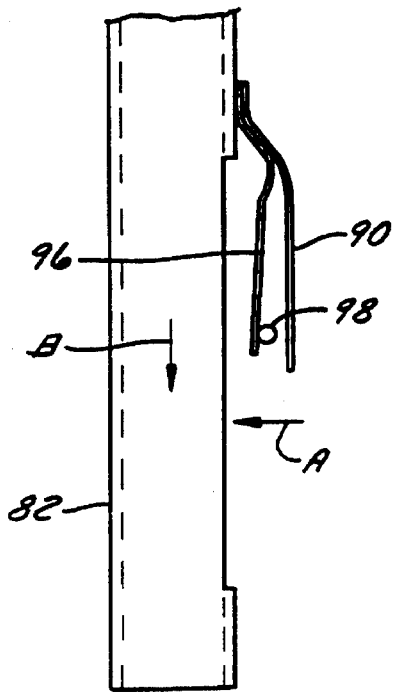
FIG. 3
FIG. 4

5,455,549

MULTI-FUNCTION BUTTON FOR ELECTRONIC OVERLOAD RELAY

BACKGROUND OF THE INVENTION

The present invention relates to the user interface of an electronic overload relay. In particular, the present invention relates to a combined test, reset and trip indicating arrangement for an overload relay.

It is known to provide overload relays with reset and test buttons, and it is also known to provide overload relays with a mechanism for indicating that the relay is tripped. However, the size and number of operating parts in known test, reset and trip indicating arrangements may not provide a design which is sufficiently compact to incorporate in trip units having smaller housing sizes. Furthermore, many designs are not sufficiently inexpensive to meet strict cost constraints imposed in overload relay designs.

Accordingly, it would be advantageous to provide a combination reset switch, test switch and trip indicator for use in electronic overload relays.

SUMMARY OF THE INVENTION

The present invention provides a hand-operated actuator for urging an electrical contact assembly between first and second positions and producing a visual indication of the status of the contacts. The actuator includes a slidable member having a longitudinal axis extending between a first end and a second end, a guide configured to slidably support the slidable member along the longitudinal axis, and a first resilient member connected to the slidable member to bias the slidable member at a first position. The slidable member urges the contact assembly into the first position when slid away from the first position in a first direction and urges the contact assembly into the second position when slid away from the first position in a second direction opposite the first. An indicator member is movably contained within the slidable member and is mechanically connectable to the contact assembly. The indicator member includes a portion which extends beyond the first end when the contact assembly is in the first position and the portion remains within the slidable member when the contact assembly is in the second position. This arrangement produces a visual indication of the status of the contact assembly.

The present invention further provides a trip unit control including a housing, and an electrical contact assembly located within the housing and movable to engage one of a first contact and a second contact. The unit also includes a tubular member having a longitudinal axis extending between a first end and a second end. The tubular member is slidably supported along the longitudinal axis relative to the housing and biased at a first position. The tubular member is configured to urge the contact assembly into engagement with the first contact when slid away from the first position in a first direction and urge the contact assembly into engagement with the second contact when slid away from the first position in a second direction opposite the first. An indicator member is movably contained within the tubular member and mechanically connectable to the contact assembly. The indicator member includes an end portion completely viewable at the first end when the contact assembly and first contact are engaged. The end portion is obstructed when the contact assembly and the second contact are engaged.

BRIEF DESCRIPTION OF THE DRAWINGS

FIG. 3 is a schematic illustration of the trip actuator and contact assembly in a second state;

FIG. 4 is a schematic illustration of a portion of the actuator; and

DETAILED DESCRIPTION OF THE PREFERRED EMBODIMENT

Figure 1:
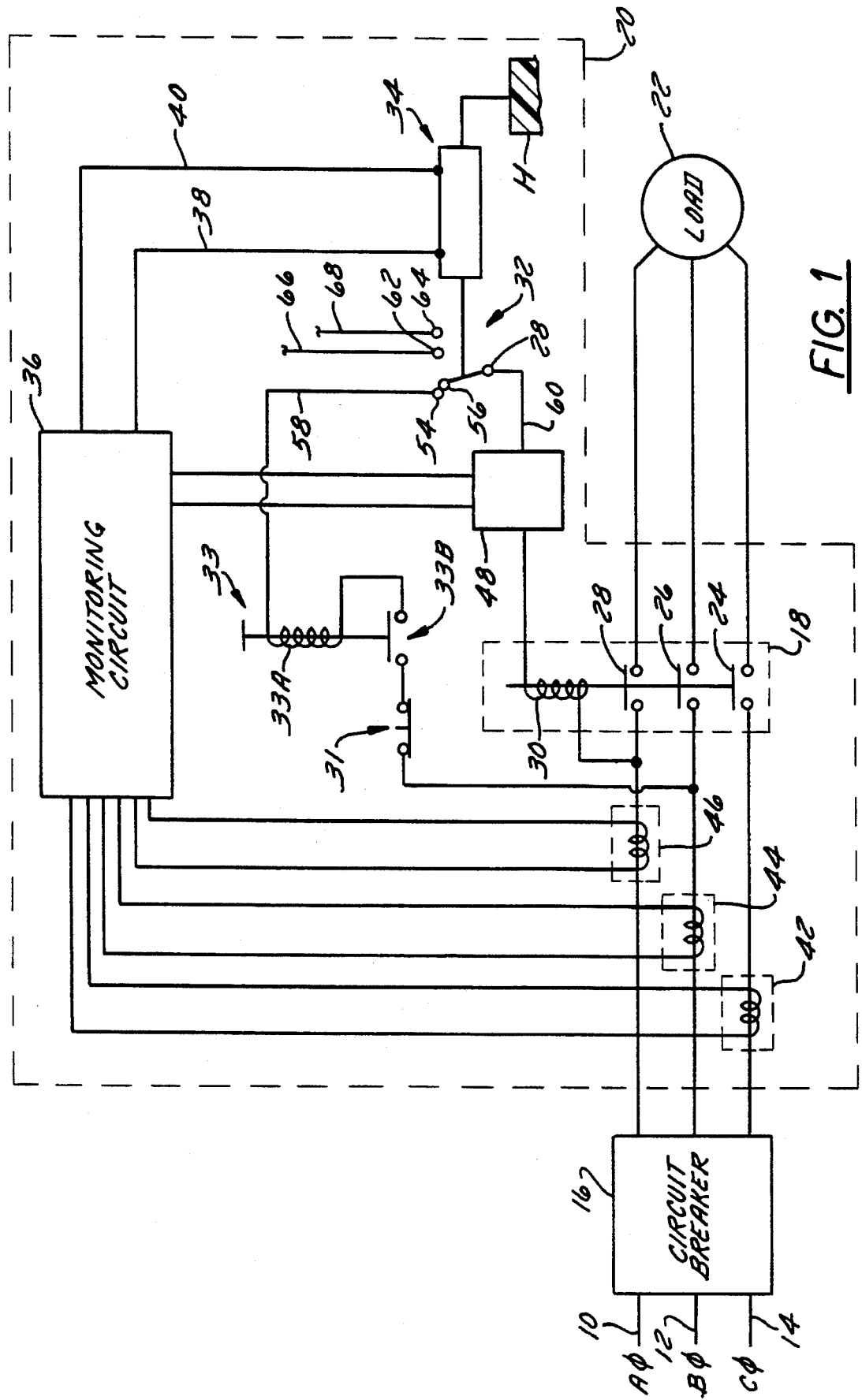
FIG. 1 is a system block diagram of a power supply control system coupled between a circuit breaker and load.

Referring to FIG. 1, a three-phase power supply control system includes an A phase conductor 10, a B phase conductor 12, a C phase conductor 14, a three-phase circuit breaker 16, a three-phase contactor 18, an overload control circuit 20, and a three-phase load 22 such as an electric motor. Circuit breaker 16 is a three-phase circuit breaker sized to appropriately protect conductors 10, 12 and 14 on the line side of the circuit breaker from damage due to electric current overloads. The load side of circuit breaker 16 is connected to contactor 18 which includes three contacts 24, 26 and 28 which move in unison to selectively connect the electrical conductors extending from the load side of circuit breaker 16 to the conductors coupled to the three-phase load 22. Contacts 24, 26 and 28 are shown schematically and are moved by a solenoid coil 30. By way of example, contactor 18 is of the type wherein contacts 24, 26 and 28 are normally open and closed in response to the energization of coil 30. By way of further example, in a system where load 22 is a 460 volt, 40 hp three-phase motor, circuit breaker 16 may be a Siemens Model No. CFD62L150 and contactor 18 may be a Siemens Model No. 3TF4822-0A.

Contactor 18 is provided to control the flow of electrical current to load 22. Contactor 18 can open the circuit in the event of overload. The control for the energization of coil 30 is provided by overload control circuit 20. In particular, coil 30 is energized from two of the three phases. One side of the coil is connected to one phase and the other side of the coil is connected to another phase by a normally closed stop switch 31, a normally closed overload switch 32, and a normally open start switch 33. Contactor 18 includes auxiliary contacts 33A to hold switch 33 closed until power is removed from coil 33 due to openings of switches 31 or 32. When switches 31, 32 and 33 are closed, coil 30 is energized, and contacts 24, 26 and 28 are closed to apply three-phase power to load 22.

The position of switch 32 is controlled by a thermal actuator 34. Thermal actuator 34 is configured to change shape or dimensions (deform) when heated by electrical current applied by a monitoring circuit 36 (described in detail below) to actuator 34 via conductors 38 and 40. Thermal actuator 34 is mechanically linked to switch 32 so that when the electrical energy applied by monitoring circuit 36 to thermal actuator 34 exceeds a predetermined limit for a predetermined time period, switch 32 is opened. In response, coil 30 is de-energized and contacts 24, 26 and 28 are opened to disconnect load 22 from the three-phase power.

The thermal actuator 34 includes an actuating member 50 (FIG. 2) which may be designed for fabrication from various materials such as bimetals or shape memory alloys (e.g. nickel-titanium materials such as Nitinol or Flexnol), and may have varying configurations depending upon the application.

In the present embodiment, the heat energy produced by the current in conductors 38 and 40 may be applied directly to actuating member 50 to cause deformation of member 50 due to heating. Alternatively, conductors 38 and 40 may be connected to conductors 38' and 40' of a heating element 52 located in proximity to actuating member 42. This arrangement also raises the temperature of member 42 to cause deformation thereof.

Regardless of the configuration used for the actuating member 50, it is advantageous to design the member to generally model the heating characteristics of load 22. In particular, for a given overload current drawn by load 22 and the associated current applied by circuit 36 to actuator 34, member 50 should deform within a predetermined time period to open switch 32. This predetermined time period should be generally the same as the time period for which load 22 can operate at the overload current before becoming damaged or significantly reducing its useful life.

Actuating member 50 may also be designed to cool down over a predetermined time period roughly similar to the cooling time of load 22 so that when an attempt is made to apply power to load 22 by depressing start switch 33, power is not applied to load 22 until actuating member 50 and load 22 have had sufficient time to cool. Until member 50 is cool enough, switch 32 will not close and permit energization of coil 30. Accordingly, if monitoring circuit 36 applies sufficient energy to thermal actuator 34 over a given period of time to open switch 32, contactor 30 cannot be re-energized until member 50 of thermal actuator 34 has cooled sufficiently to cause switch 32 to close. Alternatively, the microprocessor (U1 in FIG. 5C) of circuit 36 could be programmed to provide a digital model of load 22, thus eliminating the need to closely model load 22 with member 50.

Figure 2:
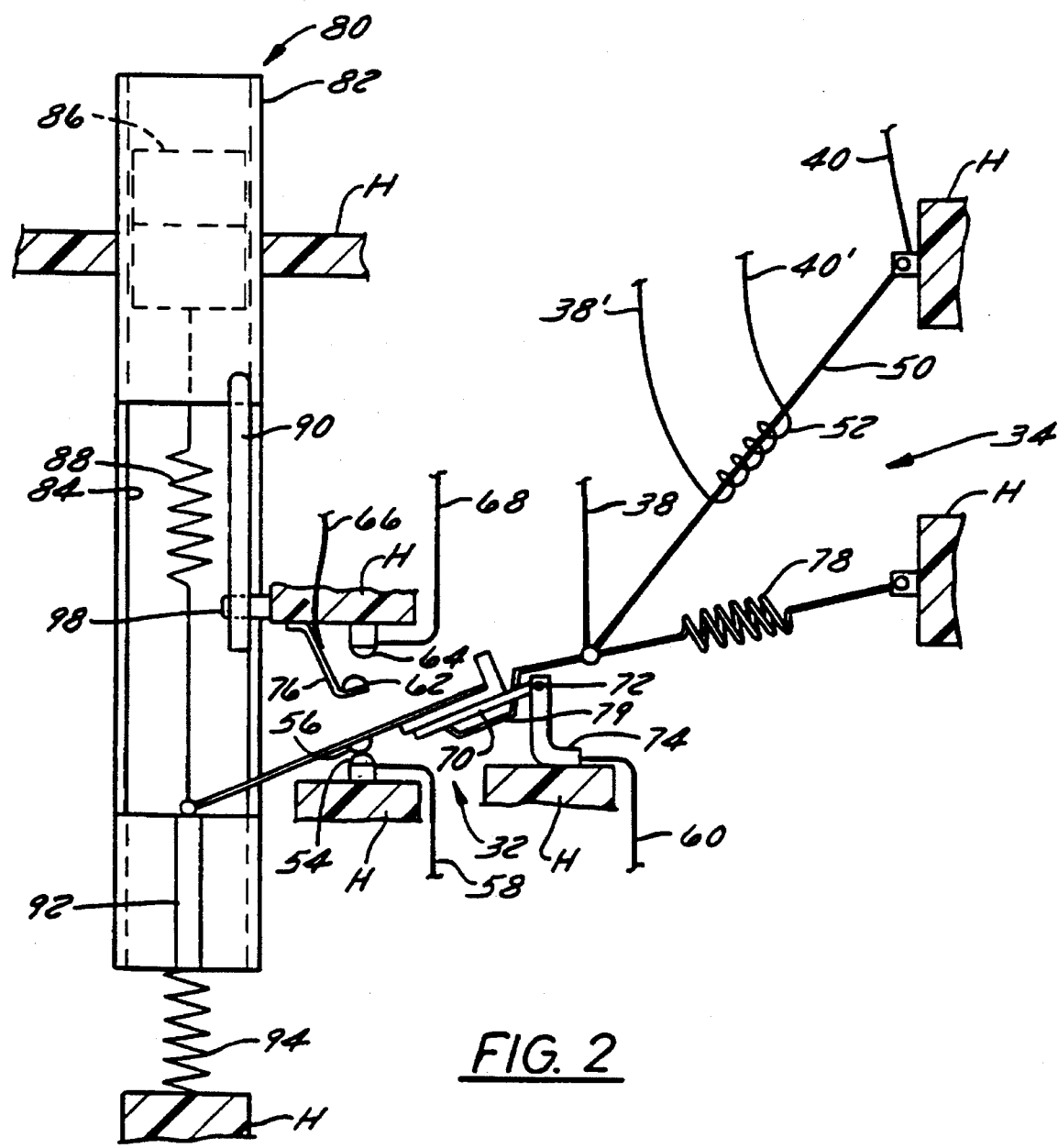
FIG. 2 is a schematic illustration of a thermal trip actuator and contact assembly in a first state.

Referring to FIGS. 2 and 3, switch 32 includes two pair of switching contacts. The first pair of contacts 54 and 56 are normally closed and connected to conductors 58 and 60, respectively. The second pair of contacts 62 and 64 are normally open and connected to conductors 66 and 68, respectively. Accordingly, when contacts 54 and 56 are closed, coil 30 of contactor 18 may be energized by depressing start button 33. Contacts 62 and 64 are provided to produce a signal which indicates that contacts 54 and 56 are open (i.e. an overload has occurred or the test function asserted and contactor 18 is open).

To clarify the drawings, the housing for actuator 34 and associated structure is not completely shown in FIGS. 2 and 3. However, where housing portions are referenced for mechanical support, these housing portions are shown and referenced with a letter H.

Turning now to the engagement of contacts 54, 56, 62 and 64, contact 54 is stationary and is supported by a portion of the housing. Contact 56 is movable and is supported by a swing arm 70 which is pivotally supported to rotate about pivot 72. Pivot 72 is supported relative to the housing by pivot support 74. Contact 64 is supported in a fixed position by the housing, and contact 62 is supported by a flexible conductor 76 which biases contact 62 away from contact 64 when arm 70 is in the position shown in FIG. 2. A spring 78 is connected to arm 70 by a member 79 which allows spring 78 to interact with arm 70 so that arm 70 is biased in either the position shown in FIG. 2 or the position shown in FIG. 3 and tends to toggle from one of these positions to the other. As discussed above, when contacts 54 and 56 are engaged, the solenoid of contact 18 will remain energized, and if not energized, can be energized upon depression of switch 33.

Turning to actuating member 50, actuating member 50 is attached to the housing and to spring 78 about at the location where spring 78 is attached to member 79. The location on which actuating member 50 is attached to spring 78 is preferably selected so as to optimize the force and stroke of actuating member 50. Accordingly, in the event that monitoring circuit 36 detects an overload condition or other unacceptable condition in the current levels on conductors 10, 12 and 14, and current is applied either directly to member 50 or to heating element 52, member 50 contracts and causes arm 70 to rotate clockwise about pivot 72 and toggle into a stable position as illustrated in FIG. 3. After the contraction of member 50 resulting from the overload condition, member 50 may relax as illustrated in FIG. 3, while arm 70 remains in the stable position shown in that FIGURE. Upon rotation of arm 70, contacts 54 and 56 are electrically disengaged and the power to solenoid 30 is discontinued so that contacts 24, 26 and 28 of contactor 18 are opened. Upon pivoting in response to the contraction of member 50, arm 70 causes contact 62 to engage contact 64. The engagement of contacts 62 and 64 produces continuity between conductors 66 and 68 which may be connected to a display circuit which drives an indicator, such as an LED located remotely. Thus, a remote visual indication can be provided which informs a user that the overload relay has tripped and contactor 18 has opened contacts 24, 26 and 28. As will be described, a mechanical indicator 86 is moved by spring 88 to provide local indication above the housing H.

Actuator 34 is also designed to reduce the possibility of breaking actuating member 50. More specifically, member 50 is fastened to spring 78 so that the resiliency in spring 78 and member 79 permit arm 70 to be forced downward by member 82 without breaking member 50.

In order to re-engage contacts 56 and 58 subsequent to the rotation of arm 70 into the position shown in FIG. 3, a multi-function push button assembly 80 is provided within actuator 34. Assembly 80 extends to the exterior of housing H to permit operation of assembly 80 by a person controlling the supply of power to load 22. Assembly 80 includes a hollow cylindrical member 82 which includes an opening 84 defined by the removal of a portion of the side wall of member 82. Assembly 80 also includes an indicator member 86, a resilient member 88 (spring), a top arm assembly 90, a bottom arm assembly 92, and a bottom resilient member 94 (spring). Assembly 80 is located within an opening in the housing which cooperates with spring 94 to permit member 80 to translate along its longitudinal axis. Spring 94 biases assembly 80 in a position which prevents assembly 80 from interfering with the rotation of arm 70 when actuating member 50 is caused to contract in response to the supply of current from monitoring circuit 36.

Indicator member 86 is a cylindrical elongated member which may include a first color on its top portion (e.g., red) and a second color on its bottom portion (e.g., black). Member 86 is connected to the end of arm 70 by spring 88 so that when arm 70 rotates about axis 72 in the clockwise direction, indicator member 86 moves from the interior of member 82 to the exterior of member 82, thus indicating that contacts 54 and 56 have been opened. Spring 88 is used to connect member 86 to the end of arm 70 so that arm 70 can rotate in response to contraction of member 50 even if member 86 is unable to translate from within member 82 to the exterior of member 82.

To rotate member 70 counter-clockwise to re-engage contacts 54 and 56, the user depresses assembly 80. When assembly 80 translates downwardly, member 90 contacts arm 70 and rotates arm 70 counter-clockwise until the end of spring 78 connected to member 80 is offset from axis 72 sufficiently to toggle the arm 70 into the stable position illustrated in FIG. 2, and thus to pull contacts 54 and 56 into engagement without further movement by assembly 80. To avoid causing contact between contacts 54 and 56 when member 50 is in its contracted state, member 90 is positioned so that assembly 80 may not be depressed far enough to place contacts 54 and 56 in contact. Additionally, member 90 is configured to disengage arm 70 just prior to engagement of contacts 54 and 56.

Referring to FIG. 4, which is a side view of member 90, member 90 has a forked configuration which enables member 90 to be bent or moved perpendicular to its direction of travel as indicated by arrow A. This motion of member 90 is achieved by providing a camming surface 96 which is engaged with a camming member 98 supported by the housing or which could be formed integral with the housing itself. Accordingly, when member 82 is translated downwardly in the direction indicated by arrow B, member 90 translates perpendicular to this direction of travel (arrow A) and disengages the end of arm 70 just prior to the engagement of contacts 54 and 56, thereby removing member 90 from contact with arm 70 and avoiding the closing of contacts 54 and 56 when element 50 is in its contracted state.

The position of member 80 at which member 90 disengages from the path of arm 70 is sufficiently past the pivot 72 so that the remaining travel of the contacts 54 and 56 is accomplished with a snap action. This camming motion of 96 on 98 (see FIG. 4) also ensures that regardless of the position of member 82, member 82 will not interfere with the motion of arm 70 in response to activation by member 50. This is known as a "trip free" feature and allows the normally closed contact 54 and 56 to move even should member 80 become jammed in any position.

In operation, the user of the overload relay must engage contacts 54 and 56 before the depression of switch 33 will energize contactor 18 and cause the application of energy to load 22. To de-energize contactor 18, the user may either depress stop switch 31 or pull button assembly 80 to cause assembly 92 to engage arm 70 and rotate arm 70 clockwise to disengage contacts 54 and 56 and force contacts 62 and 64 into engagement.

Monitoring circuit 36 monitors the current flow to load 22 based upon the level of current produced by current transformers 42, 44 and 46. Transformers 42, 44 and 46 are magnetically coupled to conductors 14, 12 and 10, respectively. Based upon the current monitored at transformers 42, 44 and 46, circuit 36 provides electrical energy to thermal actuator 34 via conductors 38 and 40.

Figure 5A:
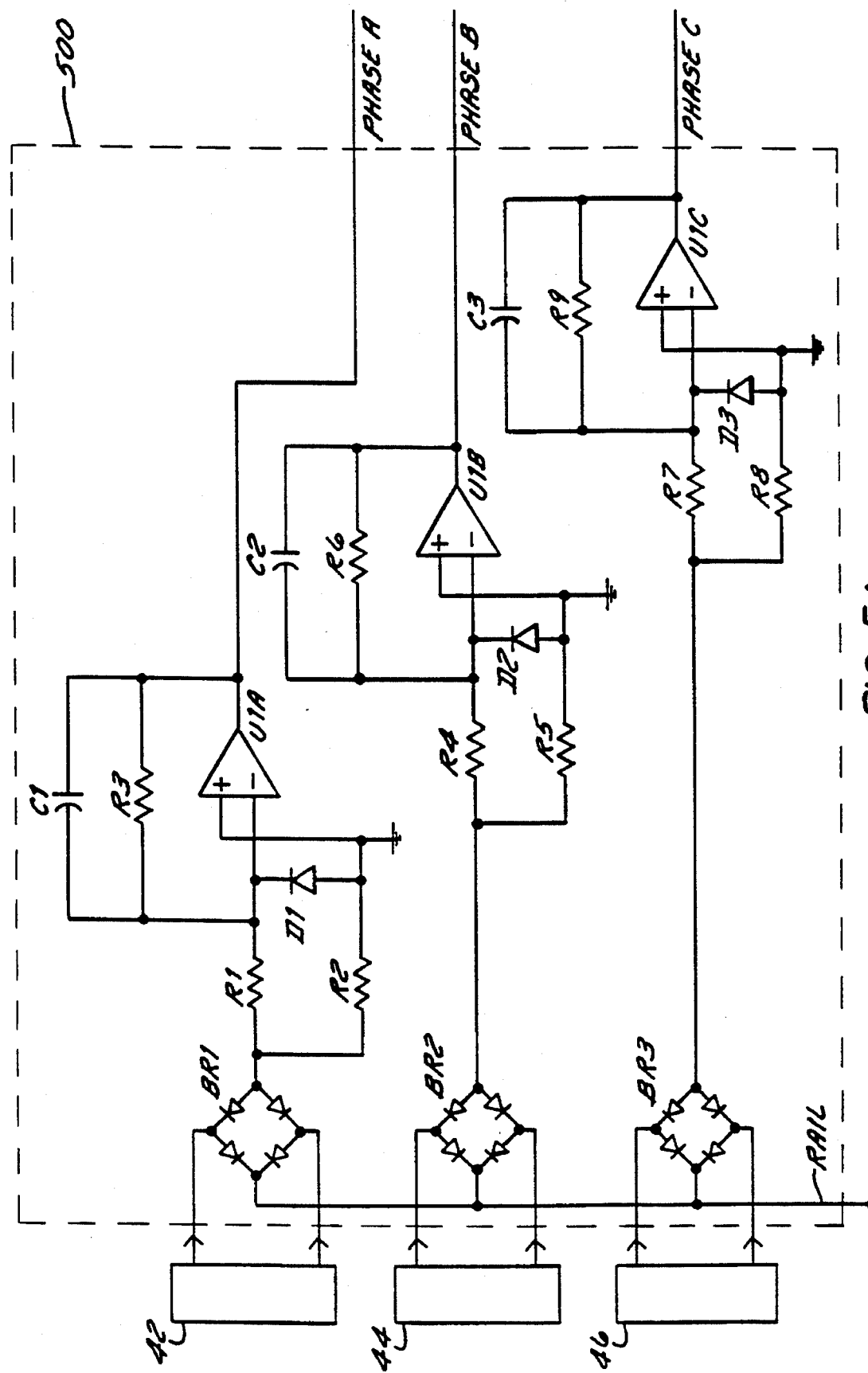
FIGS. 5A, 5B and 5C are the circuit diagram for a monitoring circuit.
Figure 5B:
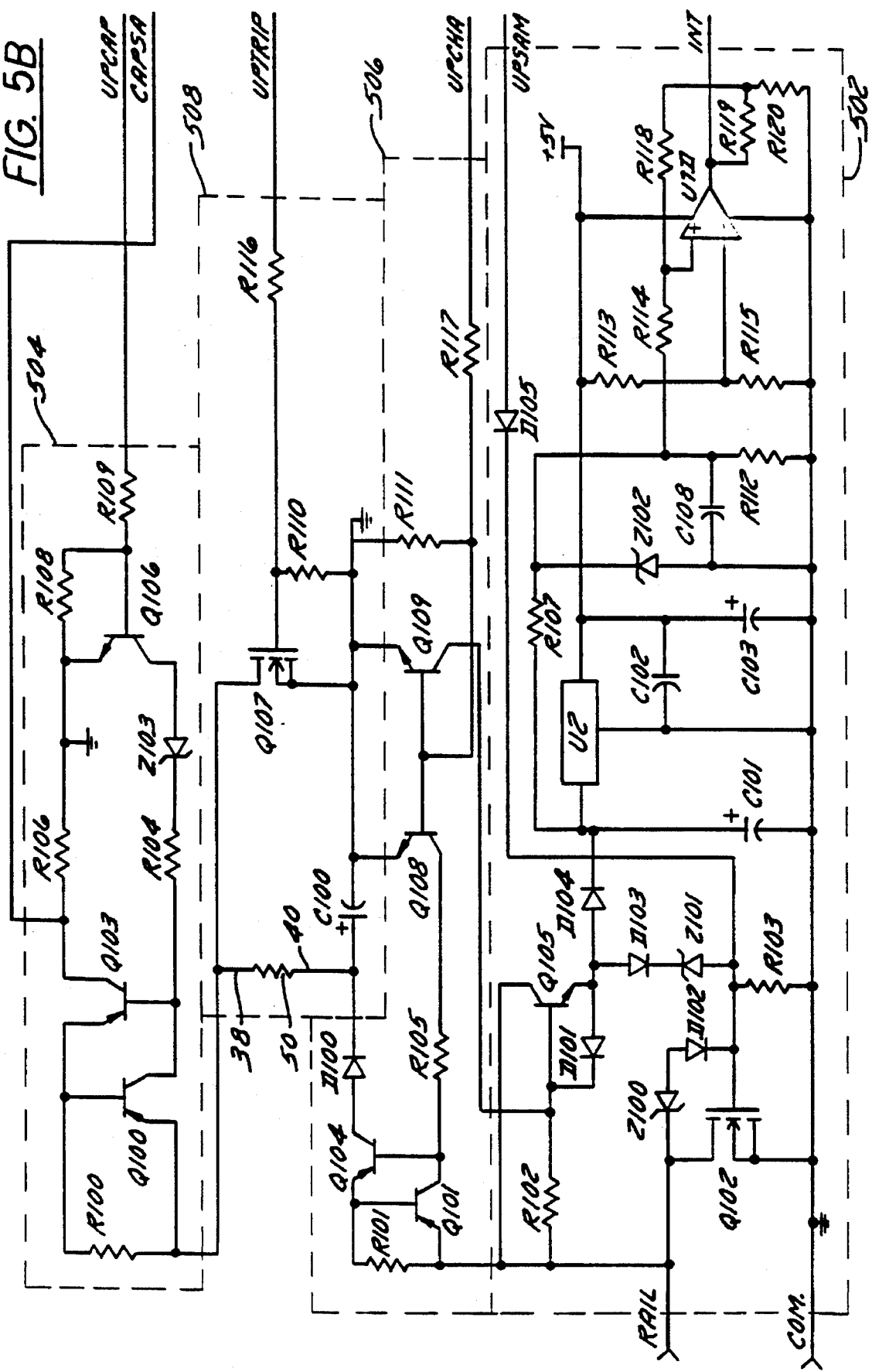
Figure 5C:
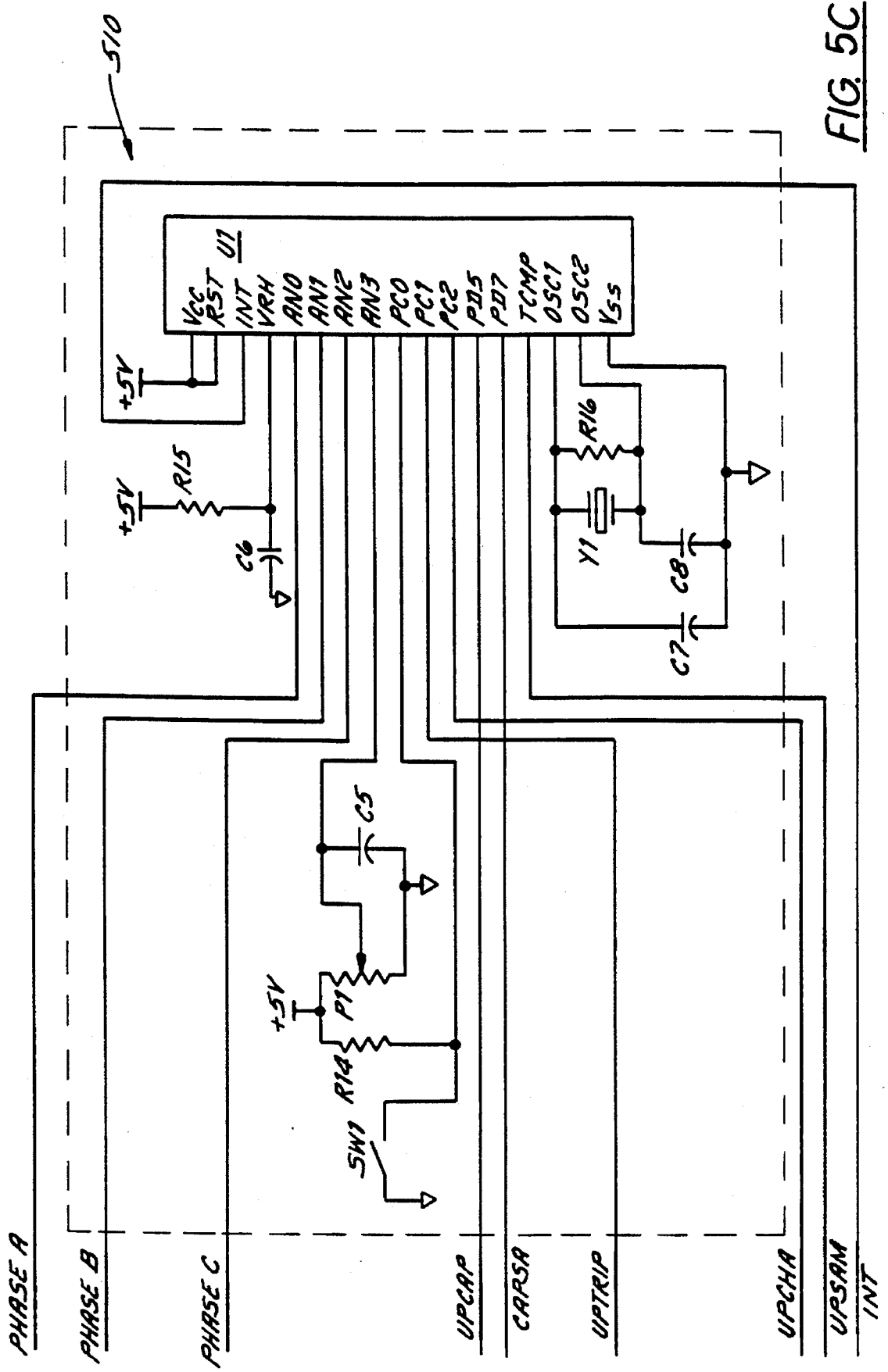

Power to monitoring circuit 36 can be provided by current transformers 42, 44 and 46, as shown in FIGS. 5A, 5B or 5C, or power can be provided by a fourth current transformer 48 (FIG. 1). However, due to the size of current transformers required to produce sufficient power to power circuit 36 and provide energy to heat thermal actuator 34, it may be more economical to utilize a single transformer 48 magnetically coupled to one of the conductors providing energy to coil 30 than to replace transformers 42, 44 and 46 with larger transformers. Additionally, the use of smaller transformers 42, 44 and 46 designed for current monitoring provides more accuracy for current monitoring.

The preferred embodiment of monitoring circuit 36 is described below in reference to the digital processor based circuit of FIGS. 5A, 5B and 5C. However, circuit 36 could be implemented with a fully analog circuit.

Circuit 36 includes a signal conditioning circuit 500 (FIG. 5A), a power supply circuit 502 (FIG. 5B), a charge sample circuit 504 (FIG. 5B), a charge control circuit 506 (FIG. 5B), a trip circuit 508 (FIG. 5B), and a digital processing circuit 510 (FIG. 5C). Circuit 500 includes full wave diode rectifiers BR1, BR2 and BR3, resistors R1, R2, R3, R4, R5, R6, R7, R8 and R9, capacitors C1, C2 and C3, diodes D1, D2 and D3, and operational amplifiers U1A, U1B and U1C which are coupled together as shown in the circuit diagram of FIG. 5A. Current transformers 42, 44 and 46 are coupled to the inputs of rectifiers BR1, BR2 and BR3, respectively. Rectifiers BR1, BR2 and BR3 provide full wave rectification for the signals produced by current transformers 42, 44 and 46.

Conditioning circuit 500 produces filtered voltage signals on lines PHASE A, PHASE B and PHASE C which are representative of (proportional to) the currents in the A, B and C phase conductors, 10, 12 and 14, respectively. The filtered voltage signals are generated from the voltages developed across burden resistors R2, R5 and R8, and are applied to the analog inputs AN0, AN1 and AN2 of circuit 510.

Power supply circuit 502 includes transistors Q102 and Q105, voltage regulator U2, operational amplifier U1D, diodes D101, D102, D103, D104 and D105, Zener diodes Z100, Z101 and Z102, resistors R102, R103, R107, R112, R113, R114, R115, R118, R119 and R120, and capacitors C101, C102, C103 and C108 which are coupled together as shown in the circuit diagram of FIG. 5B. The RAIL conductor of circuit 502 is connected to the outputs of BR1, BR2 and BR3 when the source of power for circuit 502 is current transformers 42, 44 and 46. However, when power for circuit 502 is provided by current transformer 48, as illustrated in FIG. 1, the RAIL conductor and COMMON conductors are connected to the output of a rectifier (not shown) coupled to current transformer 48.

Upon the provision of current to the RAIL conductor and through switching transistor Q105, input filter capacitor C101 is charged and regulator U2 is saturated. If the current applied to the RAIL conductor exceeds the minimum current required by the trip unit, the regulator achieves regulation, capacitor C101 receives additional charging and, as a result, the voltage on capacitor C101 increases until Zener diode Z101 conducts current. Current flow through resistor R103 increases until the sum of the fractional currents in diodes D103, D104 and field effect transistor Q102 equal the instantaneous current applied to the RAIL conductor (the instantaneous summation of the secondary currents from current transformers 42, 44 and 46, and any instantaneous current from the secondary of current transformer 48).

Transistor Q102 minimizes the compliance voltage requirements of current transformers 42, 44 and 46 when the secondary current produced by these transformers is in excess of the minimum current for the trip unit. Thus, reducing the output voltage of regulator U2 (e.g., using a 3.3 V system as opposed to a 5 V system) allows the minimum current transformer compliance voltage to be reduced to approximately $V_{min}$, where $V_{min} \cong V_{out} + V_{io} + 2V_d$ where $V_{out}$ is the regulated output voltage, $V_{io}$ is the minimum input/output differential voltage for regulator U2, and $V_d$ represents one diode drop. It should be noted that $V_{min}$ would be the nominal working voltage of the trip unit if the system was DC powered.

Since the system is AC powered, the compliance voltage of current transformers 42, 44 and 46 must be able to support a voltage higher than $V_{min}$ so that capacitor C101 can perform its "hold up" function. The voltage waveform on capacitor C101 has the shape of a single-phase or multi-phase ripple waveform, depending upon the number of current transformers providing current to the RAIL conductor.

Zener diode Z101, in conjunction with the transconductance of transistor Q105, determines the maximum voltage produced on capacitor C101. The maximum ripple voltage, $VR_{max}$, on C101 occurs when $$I_{+rail} = I_{D104} + I_{D103} + Id_{FET}$$

where the drain current of transistor Q105 is approximated by the expression $Vgs \times Gm_{FET}$, where Vgs is the gate to source voltage and $Gm_{FET}$ is the gain of transistor Q105.

Since the sum of the voltage across Zener diode Z101, Vth, the gate threshold voltage of transistor Q105, and approximately 2 Vd equals the maximum compliance voltage for current transformers 42, 44 and 46, for a given transistor Q105, Zener diode Z101 can be used to grossly set the maximum ripple voltage. The major portion of the error in setting the maximum ripple voltage by the range within which Vth of transistor Q105 can vary (i.e., $0.5 \leq Vth \leq 2.5$ volts).

As long as $V_{C101} \geq Vio + Vout$, the ripple voltage (VR) on C101 can be used to power microprocessor U1 of digital processing circuit 510 and conditioning circuit 500. The remainder of the current provided to the RAIL conductor powers sample circuit 504, control circuit 506 and trip circuit 508.

The time required to go from VRmax to VRmin is the "valid operating time", $\Delta t$, of this circuit. This valid operating time can be approximated by the expression $$\Delta t \cong (VRmax - VRmin)C101 \div I_{min}$$

where $I_{min}$ is the minimum current of the circuit.

Therefore, the power supply circuit allows microprocessor U1 to operate, process instructions, take samples, charge the tripping means, and warn/terminate operations during invalid operating conditions defined by $$I_{+rail} < I_{min} \text{ or } V_{C101} \leq VRmin$$

where $V_{C101}$ is the voltage across capacitor C101.

If the critical condition $V_{C101} \leq Vio + Vout$ occurs, the regulator saturates and the operation of the circuitry must be declared invalid. A referenced Schmitt trigger, including Zener diode Z102, capacitor C108, operational amplifier U1D, and resistors R107, R112–R115 and R118–R120 can operate on Vout and detect this condition. In response to the detection of an invalid condition, to reset microprocessor U1 or set a program flag, the output signal of amplifier U1D can be used.

Charge control circuit 506 includes transistor Q101, Q104, Q108 and Q109, diode D100, and resistors R101, R105, R111 and R117, which are coupled together as shown in the circuit diagram of FIG. 5B. Circuit 506 allows microprocessor U1 to control the charging of a large capacitor C100 (e.g., 2200 μF), which is part of trip circuit 508. In general, circuit 506 is a switched current source having a compliance voltage substantially in excess of the compliance voltage of current transformers 42, 44 and 46, or current transformer 48, depending on which of the current transformers are used as a power source. The configuration of circuit 506 as a current source is not absolutely necessary; however, this configuration allows predictable amounts of charge to be applied to capacitor C100. The charging of capacitor C100 occurs when microprocessor U1 applies a control signal to the UPCHA conductor which is connected to transistors Q108 and Q109 by resistor 117.

Charge sample circuit 504 includes transistors Q100, Q103 and Q106, Zener diode Z103, and resistors R100, R104, R106, R108 and R109, which are coupled together as shown in the circuit diagram of FIG. 5B. Circuit 504 allows microprocessor U1 to sample the charge condition of trip capacitor C100. The sample signal takes the form of a transistor transistor logic (TTL) signal, which is applied to microprocessor U1 on the CAPSA conductor. Circuit 504 is provided to control the sampling of capacitor C100 and reduce the charge loss to C100 during sampling. Additionally, to minimize charge loss to C100, sampling occurs at a relatively low duty cycle.

To initiate the sampling of capacitor C100, microprocessor U1 applies a control signal to circuit 504 along the UPCAP conductor. In response to this signal, circuit 504 produces the TTL signal, which allows microprocessor U1 to determine whether or not capacitor C100 is charged beyond a predetermined threshold.

Trip circuit 508 includes resistors R110 and R116, capacitor C100, a transistor Q107, and element 50, which are coupled together as shown in the circuit diagram of FIG. 5B. Circuit 508 controls the application of the energy from capacitor C100 to the actuating member 50. In particular, the energy from capacitor C100 is applied to member 50 when microprocessor U1 applies a signal to the UPTRIP conductor. This signal is applied to transistor Q107 via resistor 116 to cause the charge in capacitor C100 to flow through member 50 for the purpose of heating member 50. In addition, additional energy may be applied to member 50 via circuit 506 by programming microprocessor U1 to simultaneously apply control signals to the UPTRIP and UPCHA conductors. This application of control signals provides two rates at which member 50 can be heated. In particular, if a high rate of heating is required, signals are provided to both the UPTRIP and UPCHA conductors to apply a combination of the energy in capacitor C100 and the current from the RAIL conductor to member 50. In addition to causing current to flow from the RAIL conductor through member 50, the application of a control signal to the UPCHA conductor turns off transistors Q108 and Q109 so that virtually all available current is directed through member 50. Where a slower rate of heating is required, microprocessor U1 only applies a signal to the UPTRIP conductor.

Throughout the above description, microprocessor U1 (e.g., Motorola 68HC05) of digital processing circuit 510 has been referenced. In addition to microprocessor U1, digital processing circuit 510 includes capacitors C5, C6, C7 and C8, a switch SW1, a potentiometer P1, crystal Y1, and resistors R14, R15 and R16, which are coupled together with microprocessor U1 as shown in FIG. 5C. These components of circuit 510 provide a voltage reference (overload setting) for microprocessor U1, a reset for microprocessor U1, and the oscillator for the clock of microprocessor U1.

Microprocessor U1 is programmed to provide the logic and control for monitoring circuit 36. Microprocessor U1 is programmed to monitor the signals representative of the currents in phase conductors Aφ, Bφ and Cφ, which are applied to analog inputs AN0, AN1 and AN2, respectively. The analog-to-digital converter built into microprocessor U1 converts the analog signals at inputs AN0, AN1 and AN2 into digital values. During the sampling mode of microprocessor U1, microprocessor U1 applies a control signal to the UPSAM conductor, which places transistor Q102 in a saturated mode, which thereby minimizes the burden on current transformers 42, 44 and 46. It is desirable to reduce the burden on current transformers 42, 44 and 46 since this reduces the distortion in the signals produced by current transformers 42, 44 and 46 and permits microprocessor U1 to drive signals representative of the currents in the phase conductors which are more accurate. To assure that adequate energy is provided when channels AN0, AN1 and AN2 are sampled, microprocessor U1 also verifies that the voltage on capacitor C101 is adequate. (Where current transformer 48 is used for power rather than current transformers 42, 44 and 46, minimizing the burden on current transformers 42, 44 and 46 due to the application of power to monitoring circuit 36 is not required.)

Subsequent to obtaining samples at AN0, AN1 and AN2, microprocessor U1 terminates the application of the control signal to the UPSAM conductor to resume the application of power to circuit 36. Microprocessor U1 then analyzes the digital data produced by its analog-to-digital converter which is representative of the currents in the A, B and C phase conductors. Microprocessor U1 may be programmed to analyze the digital data representative of phase currents (e.g., RMS current data, peak current data) in a number of various ways for the purpose of causing energy to be applied to member 50. For example, microprocessor U1 may be programmed to determine whether or not a ground fault condition exists (i.e., the current in all of the phase conductors does not sum to zero), to determine if one of the phase currents exceeds a predetermined limit, or to determine if the various current levels in the phase conductors exceed a set of predetermined limits which indicate that the balance of the current levels in the phase conductors are unacceptable. When microprocessor U1 determines that the current in one or all of the phase conductors is unacceptable, signals are variously applied to the UPTRIP and UPCHA conductors to apply energy to member 50 and cause member 50 to move arm 70 which results in the opening of the contacts in contactor 18, as discussed above.

It will be understood that the description above is of the preferred exemplary embodiment of the invention and that the invention is not limited to the specific forms shown and described. For example, microprocessor U1 may be replaced with a suitably configured analog circuit. Furthermore, as discussed above, it is contemplated that the power for control circuit 36 may come from current transformers 42, 44 and 46, or may come from some other source such as current transformer 48. By way of another modification, control circuit 20 could be modified to also operate with a neutral conductor in addition to the phase conductors. Other substitutions, modifications, changes and omissions may be made in the design and arrangement of the preferred embodiment without departing from the spirit of the invention as expressed in the appended claims.

What is claimed is:

1. A hand-operated actuator for urging an electrical contact assembly between first and second positions and producing a visual indication of the status of the contacts, the actuator comprising:

a slidable member having a longitudinal axis extending between a first end and a second end;

a guide configured to slidably support the slidable member along the longitudinal axis;

a first resilient member connected to the slidable member to bias the slidable member at a first position, the slidable member being configured to urge the contact assembly into the first position when slid away from the first position in a first direction and urge the contact assembly into the second position when slid away from the first position in a second direction opposite the first; and an indicator member movably contained within the slidable member and mechanically connectable to the contact assembly, the indicator member including a portion extending beyond the first end when the contact assembly is in the first position and the portion remaining within the slidable member when the contact assembly is in the second position to produce the visual indication of the status of the contact assembly.

2. The actuator of claim 1, wherein the slidable member has a circular cross-section.

3. The actuator of claim 1, wherein the slidable member has a rectangular cross-section.

4. The actuator of claim 1, wherein the slidable member is fabricated from plastic.

5. The actuator of claim 1, wherein the slidable member is configured to include a first member extending outwardly from the slidable member to engage the contact assembly upon urging the assembly to the first position.

6. The actuator of claim 5, wherein the slidable member is configured to include a second member extending outwardly from the slidable member to engage the contact assembly upon urging the assembly to the second position.

7. The actuator of claim 1, wherein the first resilient member is a spring.

8. The actuator of claim 1, wherein the slidable member defines an opening and the indicator member includes a second resilient member which extends through the opening to connect the indicator member to the contact assembly.

9. The actuator of claim 8, wherein the second resilient member is a spring.

10. The actuator of claim 1, wherein the first end of the slidable member has a first color and a portion of the indicator has a second color different from the first color.

11. An overload relay control comprising:

a housing;

an electrical contact assembly located within the housing and movable to engage one of a first contact and a second contact;

a tubular member having a longitudinal axis extending between a first end and a second end;

a guide supported by the housing to slidably support the tubular member along the longitudinal axis;

a first resilient member connected to the tubular member to bias the tubular member at a first position, the tubular member being configured to urge the contact assembly into engagement with the first contact when slid away from the first position in a first direction and to urge the contact assembly into engagement with the second contact when slid away from the first position in a second direction opposite the first; and an indicator member movably contained within the tubular member and mechanically connectable to the contact assembly, the indicator member including a portion extending beyond the first end when the contact assembly and first contact are engaged and the portion remaining within the tubular member when the contact assembly and the second contact are engaged.

12. The control of claim 11, wherein the contact assembly includes a pivoting arm which permits the assembly to move between the first and second contacts, and a second resilient member which holds the contact assembly in engagement with one of the first and second contacts.

13. The control of claim 12, wherein the second resilient member is a spring.

14. The control of claim 12, wherein the second contact and the contact assembly are connectable to a solenoid coil of a contactor and a power supply, and the coil is energized when the contact assembly and the second contact are engaged.

15. The control of claim 11, wherein the tubular member has a circular cross-section.

16. The control of claim 11, wherein the housing includes an opening through which the tubular member extends to permit hand operation of the tubular member.

17. The control of claim 11, wherein the tubular member is configured to include a first member extending outwardly from the tubular member to engage the contact assembly upon urging the assembly into engagement with the first contact.

18. The control of claim 17, wherein the tubular member is configured to include a second member extending outwardly from the tubular member to engage the contact assembly upon urging the assembly into engagement with the second contact.

19. The control of claim 11, wherein the tubular member defines an opening and the indicator member includes a third resilient member which extends through the opening to connect the indicator member to the contact assembly.

20. The control of claim 11, wherein the first end of the tubular member has a first color and the portion of the indicator has a second color different from the first color.

21. An overload relay control comprising:

a housing;

an electrical contact assembly located within the housing and movable to engage one of a first contact and a second contact;

a tubular member having a longitudinal axis extending between a first end and a second end, the tubular member being slidably supported along the longitudinal axis relative to the housing and biased at a first position, wherein the tubular member is configured to urge the contact assembly into engagement with the first contact when slid away from the first position in a first direction and to urge the contact assembly into engagement with the second contact when slid away from the first position in a second direction opposite the first; and an indicator member movably contained within the tubular member and mechanically connectable to the contact assembly, the indicator member including an end portion completely viewable at the first end when the contact assembly and first contact are engaged, where viewing of the end portion is obstructed when the contact assembly and the second contact are engaged.

22. The relay of claim 21, wherein the contact assembly includes a pivoting arm which permits the assembly to move between the first and second contacts, and a second resilient member which holds the contact assembly in engagement with one of the first and second contacts.

23. The relay of claim 22, wherein the second contact and the contact assembly are connectable to a solenoid coil of a contactor and a power supply, and the coil is energized when the contact assembly and the second contact are engaged.

24. The relay of claim 21, wherein the housing includes an opening through which the tubular member extends to permit hand operation of the tubular member, and one of the tubular member and the housing obstructs viewing of the end portion when the contact assembly and the first contact are engaged.

25. The relay of claim 21, wherein the tubular member is configured to include a first member extending outwardly from the tubular member to engage the contact assembly upon urging the assembly into engagement with the first contact.

26. The relay of claim 25, wherein the tubular member is configured to include a second member extending outwardly from the tubular member to engage the contact assembly upon urging the assembly into engagement with the second contact.

27. The relay of claim 21, wherein the tubular member defines an opening and the indicator member includes a resilient member which extends through the opening to connect the indicator member to the contact assembly.

28. The relay of claim 21, wherein the first end of the tubular member has a first color and the end portion of the indicator has a second color different from the first color.

29. The relay of claim 21, wherein the tubular member is fabricated from clear plastic.

30. A hand-operated actuator for urging an electrical contact assembly between first and second positions and producing a visual indication of the status of the contacts, the actuator comprising:

a slidable member having a longitudinal axis extending between a first end and a second end, the slidable member including a cam actuated component;

a guide configured to slidably support the slidable member along the longitudinal axis;

a first resilient member connected to the slidable member to bias the slidable member at a first position, the cam actuated component being configured to engage and urge the contact assembly into the first position when the slidable member is slid away from the first position in a first direction, the cam actuated component disengaging the contact assembly prior to the contact assembly reaching the first position; and further comprising an indicator member movably contained within the slidable member and mechanically connectable to the contact assembly, the indicator member including a portion extending .beyond the first end when the contact assembly is in the first position and the portion remaining within the slidable member when the contact assembly is in the second position to produce the visual indication of the status of the contact assembly.

31. The actuator of claim 30, wherein the slidable member has a circular cross-section.

32. The actuator of claim 30, wherein the slidable member has a rectangular cross-section.

33. The actuator of claim 30, wherein the slidable member is fabricated from plastic.

34. The actuator of claim 30, wherein the first resilient member is a spring.

35. The actuator of claim 30, wherein the slidable member defines an opening and the indicator member includes a second resilient member which extends through the opening to connect the indicator member to the contact assembly.

36. The actuator of claim 35, wherein the second resilient member is a spring.

37. The actuator of claim 30, wherein the first end of the slidable member has a first color and a portion of the indicator has a second color different from the first color.

38. The actuator of claim 30, wherein the cam actuated component includes a cam element separate from an engagement portion of the component which engages the contact assembly, the guide including a cam surface configured to interact with the cam element to disengage the engagement portion from the contact assembly in response to movement of the slidable member towards the first position.

* * * * *